US009660969B2

(12) United States Patent
Qian et al.

(10) Patent No.: US 9,660,969 B2
(45) Date of Patent: May 23, 2017

(54) METHOD AND APPARATUS FOR PROVIDING KEY MANAGEMENT FOR DATA ENCRYPTION FOR CLOUD-BASED BIG DATA ENVIRONMENTS

(71) Applicant: HERE Global B.V., Veldhoven (NL)

(72) Inventors: Gaoqiang Qian, Watertown, MA (US); Sumit Lonial, Bedford, MA (US); Zahid N Ahmed, Westborough, MA (US)

(73) Assignee: HERE Global B.V., Veldhoven (NL)

( * ) Notice: Subject to any disclaimer, the term of this patent is extended or adjusted under 35 U.S.C. 154(b) by 42 days.

(21) Appl. No.: 14/674,710

(22) Filed: Mar. 31, 2015

(65) Prior Publication Data

US 2016/0294548 A1    Oct. 6, 2016

(51) Int. Cl.
   *H04L 29/00* (2006.01)
   *H04L 29/06* (2006.01)

(52) U.S. Cl.
   CPC ........ *H04L 63/062* (2013.01); *H04L 63/0823* (2013.01); *H04L 63/102* (2013.01); *H04L 2463/062* (2013.01)

(58) Field of Classification Search
   CPC combination set(s) only.
   See application file for complete search history.

(56) References Cited

U.S. PATENT DOCUMENTS

| | | | |
|---|---|---|---|
| 8,290,165 B2 | 10/2012 | Allen et al. | |
| 8,654,971 B2 | 2/2014 | Orsini et al. | |
| 8,700,892 B2 | 4/2014 | Bollay et al. | |
| 8,782,774 B1 | 7/2014 | Pahl et al. | |
| 2006/0155855 A1* | 7/2006 | Hamai | H04L 63/0823 709/227 |
| 2008/0184349 A1* | 7/2008 | Ting | H04L 9/3231 726/7 |
| 2008/0222696 A1* | 9/2008 | Nicodemus | H04L 63/102 726/1 |
| 2008/0273706 A1 | 11/2008 | Noll | |
| 2014/0050317 A1 | 2/2014 | Sabin | |
| 2014/0281477 A1 | 9/2014 | Nayshtut et al. | |

* cited by examiner

*Primary Examiner* — Ghazal Shehni
(74) *Attorney, Agent, or Firm* — Ditthavong & Steiner, P.C.

(57) ABSTRACT

An approach is provided for key management for data encryption. A key management platform receives a request from at least one client for one or more private keys for decrypting one or more datasets. The one or more private keys are encrypted in at least one key repository associated with at least one server. The key management platform also causes, at least in part, an authentication of the request using one or more secure credentials of the at least one client, the at least one server, or a combination thereof. The key management platform further causes, at least in part, an authorization of the at least one client to determine whether the at least one client is authorized to access the one or more private keys based on the authentication. The key management platform further causes, at least in part, a decryption of the one or more private keys using at least one master key based on the authorization.

20 Claims, 12 Drawing Sheets

METHOD AND APPARATUS FOR PROVIDING KEY MANAGEMENT FOR DATA ENCRYPTION FOR CLOUD-BASED BIG DATA ENVIRONMENTS

BACKGROUND

Service providers are continually challenged to deliver value and convenience to consumers by, for example, providing compelling network services. To support such services, service providers often manage and process large data assets for access by different business units or entities. Moreover, because such data assets often contain sensitive or private data, these data assets have traditionally been encrypted to for data security. However, implementing encryption across large datasets that are accessed by multiple business units and/or entities can potentially be burdensome with respect to providing secure access to encryption keys to authorized users. Accordingly, service providers face significant technical challenges to enabling secure management of encryption keys while facilitating efficient interaction among the business units/entities of an organizations and their data assets.

SOME EXAMPLE EMBODIMENTS

Therefore, there is a need for an approach for providing key management for encryption of data assets.

According to one embodiment, a method comprises receiving a request from at least one client for one or more private keys for decrypting one or more datasets, wherein the one or more private keys are encrypted in at least one key repository associated with at least one server. The method also comprises causing, at least in part, an authentication of the request using one or more secure credentials of the at least one client, the at least one server, or a combination thereof. The method further comprises causing, at least in part, an authorization of the at least one client to determine whether the at least one client is authorized to access the one or more private keys based on the authentication. The method further comprises causing, at least in part, a decryption of the one or more private keys using at least one master key based on the authorization.

According to another embodiment, an apparatus comprises at least one processor, and at least one memory including computer program code for one or more computer programs, the at least one memory and the computer program code configured to, with the at least one processor, cause, at least in part, the apparatus to receive a request from at least one client for one or more private keys for decrypting one or more datasets, wherein the one or more private keys are encrypted in at least one key repository associated with at least one server. The apparatus also causes, at least in part, an authentication of the request using one or more secure credentials of the at least one client, the at least one server, or a combination thereof. The apparatus further causes, cause, at least in part, an authorization of the at least one client to determine whether the at least one client is authorized to access the one or more private keys based on the authentication. The apparatus further causes, at least in part, a decryption of the one or more private keys using at least one master key based on the authorization.

According to another embodiment, a computer-readable storage medium carries one or more sequences of one or more instructions which, when executed by one or more processors, cause, at least in part, an apparatus to receive a request from at least one client for one or more private keys for decrypting one or more datasets, wherein the one or more private keys are encrypted in at least one key repository associated with at least one server. The apparatus also causes, at least in part, an authentication of the request using one or more secure credentials of the at least one client, the at least one server, or a combination thereof. The apparatus further causes, cause, at least in part, an authorization of the at least one client to determine whether the at least one client is authorized to access the one or more private keys based on the authentication. The apparatus further causes, at least in part, a decryption of the one or more private keys using at least one master key based on the authorization.

According to another embodiment, an apparatus comprises means for receiving a request from at least one client for one or more private keys for decrypting one or more datasets, wherein the one or more private keys are encrypted in at least one key repository associated with at least one server. The apparatus also comprises means for causing, at least in part, an authentication of the request using one or more secure credentials of the at least one client, the at least one server, or a combination thereof. The apparatus also comprises means for causing, at least in part, an authorization of the at least one client to determine whether the at least one client is authorized to access the one or more private keys based on the authentication. The apparatus further comprises means for causing, at least in part, a decryption of the one or more private keys using at least one master key based on the authorization.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the user device side or in any shared way between service provider and user device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing key management for data encryption according to one embodiment are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
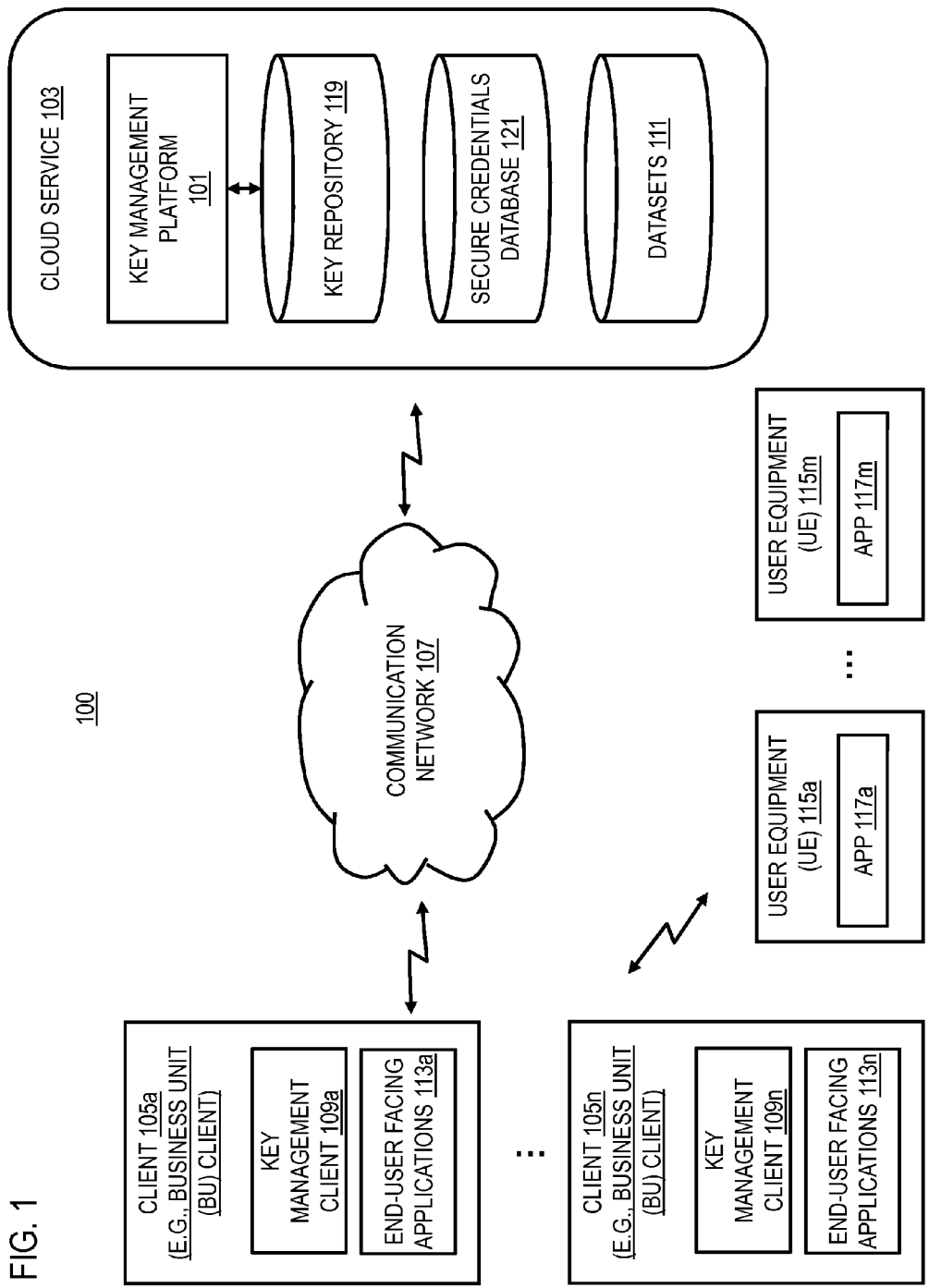
FIG. 1 is a diagram of a system capable of providing key management for data encryption, according to one embodiment.

FIG. 1 is a diagram of a system capable of providing key management for data encryption, according to one embodiment. With an increasing demand for network services (e.g., social networking services, media services, etc.), the need to properly manage access to data stored by such services is of growing concern. An integral part of such services includes providing data to users while allowing for scalability and redundancy as the volume of data handled by the services increases. As a result, service providers have developed cloud-based storage platforms (e.g., distributed storage platforms) capable of handling vast collections of large databases that store, for instance, information, data, etc. generated by any number of services (e.g., both integrated and individual services).

However, because many of these datasets include private or otherwise sensitive data (e.g., customer privacy data), service providers often employ security measures (e.g., data encryption) to protect the datasets. At the same time, organizations with multiple business units that have traditionally maintained separate datasets need a way to interact with each other to produce improved data driven business analysis solutions. Moreover, such organizations often have security requirements to have an end-to-end self-controlled key management system to manage all of the keys (e.g., public/private keys for asymmetric data encryption) used to secure the datasets migrated to cloud storage services.

To address this problem, a system 100 of FIG. 1 introduces a capability to provide multiple levels of security to homogenize the management of datasets stored in the cloud via a multi-layer secured key management platform 101. In one embodiment, the system 100 also provides a transparent data tool or interface for individual business units of an organization to ingest and process encrypted data transparently without knowing the details of the encryption and/or decryption by encapsulating the encryption logic within the key management platform 101 operating, for instance, in combination with a cloud service 103.

In one embodiment, one or more individual clients 105a-105n [also collectively referred to as clients 105 and, e.g., corresponding to individual business units (BU)] have access to the key management platform 101 and the cloud service 103 over a communication network 107. In one embodiment, the clients 105a-105n respectively execute one or more key management clients 109a-109n to interact with or perform all or a portion of the functions of the key management platform 101. Descriptions of various embodiments of the functions of the key management platform 101 and/or key management client 109 are discussed in more detail below.

In one embodiment, the key management platform 101 securely manages all of the datasets 111 collected from various end-user facing applications 113a-113n (also collectively referred to as end-user facing applications 113). For example, individual BU clients 105 may manage the datasets 111 to support end-user facing applications 113 (e.g., streaming media services, mapping services, social networking services, media sharing services, etc.) accessible by one or more user equipment (UEs) 115a-115m (also collectively referred to as UEs 115). In one embodiment, the UEs 115 may execute one or more applications 117a-117m (also collectively referred to as applications 117) to access the end-user facing applications 113 and/or the datasets 111. By way of example, the applications 117 can be either native applications associated with the end-user facing applications 117 (e.g., client applications) or general applications (e.g., a browser application) that can access the end-user facing applications 113 when implemented as a network-side application (e.g., a web application) or web page.

As previously discussed, in one embodiment, the datasets 111 associated with end-user facing applications 113 may be privacy involved or otherwise sensitive. Accordingly, the system 100 encrypts the datasets 111 with keys controlled by the key management platform 101 using various embodiments of the multi-layered security mechanisms described herein to protect the datasets against being comprised to un-intended or un-authorized parties (e.g., external and/or internal parties). In one embodiment, the key management platform 101 stores the keys in a key repository 119 or other equivalent data storage.

In one embodiment, to provide secured key management, the key management platform 101 combines multiple mitigating security controls over the keys that are used to encrypt and decrypt the datasets 111 controlled by the system 100. For example, with this multi-layered secured approach, even if one or some of the layers are compromised, the data secured according to various embodiments of the system 100 will not be able to be decrypted because there are other layers of protection.

In one embodiment, the key management platform 101 and the system 100 uses secured communications protocols [e.g., a Secure Sockets Layer (SSL) protocol] as one layer of protection. For example, the key management platform 101 can employ a two-way SSL authentication, where a client 105 uses an SSL certificate for authentication authenticated (e.g., by the key management platform 101, the cloud service 103, and/or another component of the system 100). In one embodiment, the secured credentials (e.g., the SSL certificates) are stored in the secure credentials database 121 of the cloud service 103.

As another layer of security, in one embodiment, access to the secure credentials database 119 and/or the SSL certificates are restricted to clients 103 (e.g., business unit users) that have been appropriately provisioned. As yet another layer of security, in one embodiment, the key management platform 101 performs an authorization check upon receiving a key retrieval request (e.g., from a client 105) to ensure that the requesting party is authorized to request or obtain the subject key. Accordingly, even if an SSL certificate or other secure credentials is compromised, the key management platform 101 (e.g., via the authorization process) can prevent an external party from retrieving the key for any particular dataset 111 to which the party is not entitled.

In one embodiment, the key management platform 101 applies encryption to keys stored in the key repository 1119 as yet another layer of security beyond authentication (e.g., via SSL) and authorization (e.g., determining whether a requesting client 105 is provisioned or authorized to access a dataset). Accordingly, even if a requesting party is authenticated and then authorized to a certain dataset 111, the requesting party would still need to have, e.g., a master key to decrypt the key retrieved from the key repository 119. By way of example, in one embodiment, the key retrieved from the key repository 119 (e.g., a private key of an asymmetric encryption scheme) can be encrypted with credentials in a client library (e.g., a JAVA client library) that is distributed to trusted parties (e.g., trusted clients 105 or other trusted components), to be able to decrypt the keys retrieved from the key repository 119. Additional layers of security are described in the various embodiments discussed below.

In other words, various embodiments of the key management platform 101 stores secure credentials (e.g., SSL certificates) in a controlled common repository (e.g. the key repository 119). In this context, a control common repository permits only privileged users to have access to the SSL certificates or other credentials in the key repository 119. This helps to ensure that only privileged users (e.g., provisioned, authenticated, and/or authorized users) can have access to the decryption keys associated with each dataset 111 or dataset domain.

In one embodiment, the key management platform 101 provides end-to-end security that includes authentication, authorization, and also delivery of secured decryption information for encrypted data. In yet another embodiment, the key management platform 101 is a self-containing key management service that provides internal authentication and authorization mechanisms with proprietary keys. For example, the self-contained platform 101 can be managed by individual organizations to service their respective units without exposing or outsourcing the key management services or functions to external cloud-based key management systems. For example, the key management platform 101 enables, e.g., as another security layer, organizations to set access control policies for any element of the system 100 (e.g., access to secure credentials, access to keys, access to datasets, access to a master, access to keys for ingesting/encrypting data, etc.) either individually or in combination.

In one embodiment, the decryption function of the key management platform 101 is at rest. In other words, the key management platform 101 securely transmits keys (e.g., private keys) over, e.g., Rest Application Programming Interface (API) protocols. In this way, the private key can be only retrieved by authenticated and/or authorized parties using privileged computing environments. As previously noted, this provides another level of security to protect data against unauthorized access even when a private key is compromised.

In one embodiment, the cloud service 103 includes one or more storage platforms (e.g., distributed storage platforms) capable of handling vast collections of large databases that store, for instance, information, data, etc. generated by any number of services (e.g., both integrated and individual services) of the clients 105 (e.g., computing nodes, clusters, servers, etc.). Many of these databases can reach multiple terabytes, petabytes, or more in size. In some cases, storage platforms can additionally split larger databases into smaller databases (e.g., partitions or database shards) maintained at multiple nodes to allow for the scalability and/or redundancy. By way of example, the storage platforms can include relational databases, key value stores, and/or other database structure.

In one embodiment, the UEs 115 may be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 115 can support any type of interface to the user (such as "wearable" circuitry, etc.).

The communication system 107 of system 100 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof. Further, fast connections (e.g., gigabit Ethernet, fiber channel, etc.) can be utilized among any of the components of the system 100.

By way of example, the components of the system 100 communicate with each other and using well known, new or still developing protocols (e.g., including SSL protocols). In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the components of the system 100 may interact according to a client-server model. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
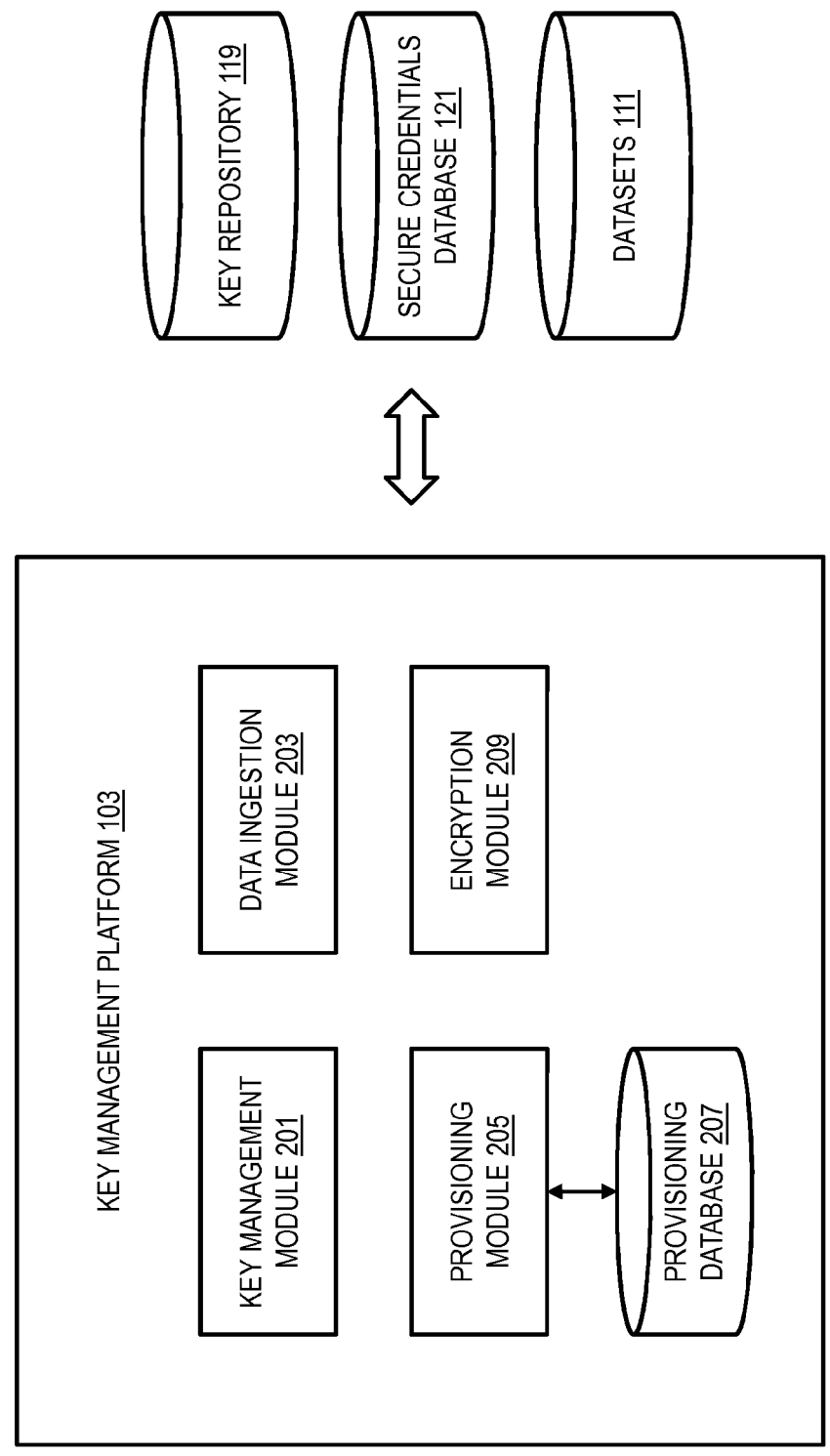
FIG. 2 is a diagram of the components of a key management platform, according to one embodiment.

FIG. 2 is a diagram of the components of a key management platform, according to one embodiment. By way of example, the key management platform 101 (network-side component) and the key management client 109 (client-side component) include one or more components for providing key management for data encryption. It is contemplated that the functions of these components may be combined in one or more components or performed by other components of equivalent functionality. In one embodiment, the key management platform 101 includes a key management module 201, a data ingestion module 203, a provisioning module 205, a provisioning database 207, and an encryption module 209. In one embodiment, the key management platform 101 and/or its components have connectivity to the key repository 119, the secure credentials database 121, and the datasets 111.

Figure 3:
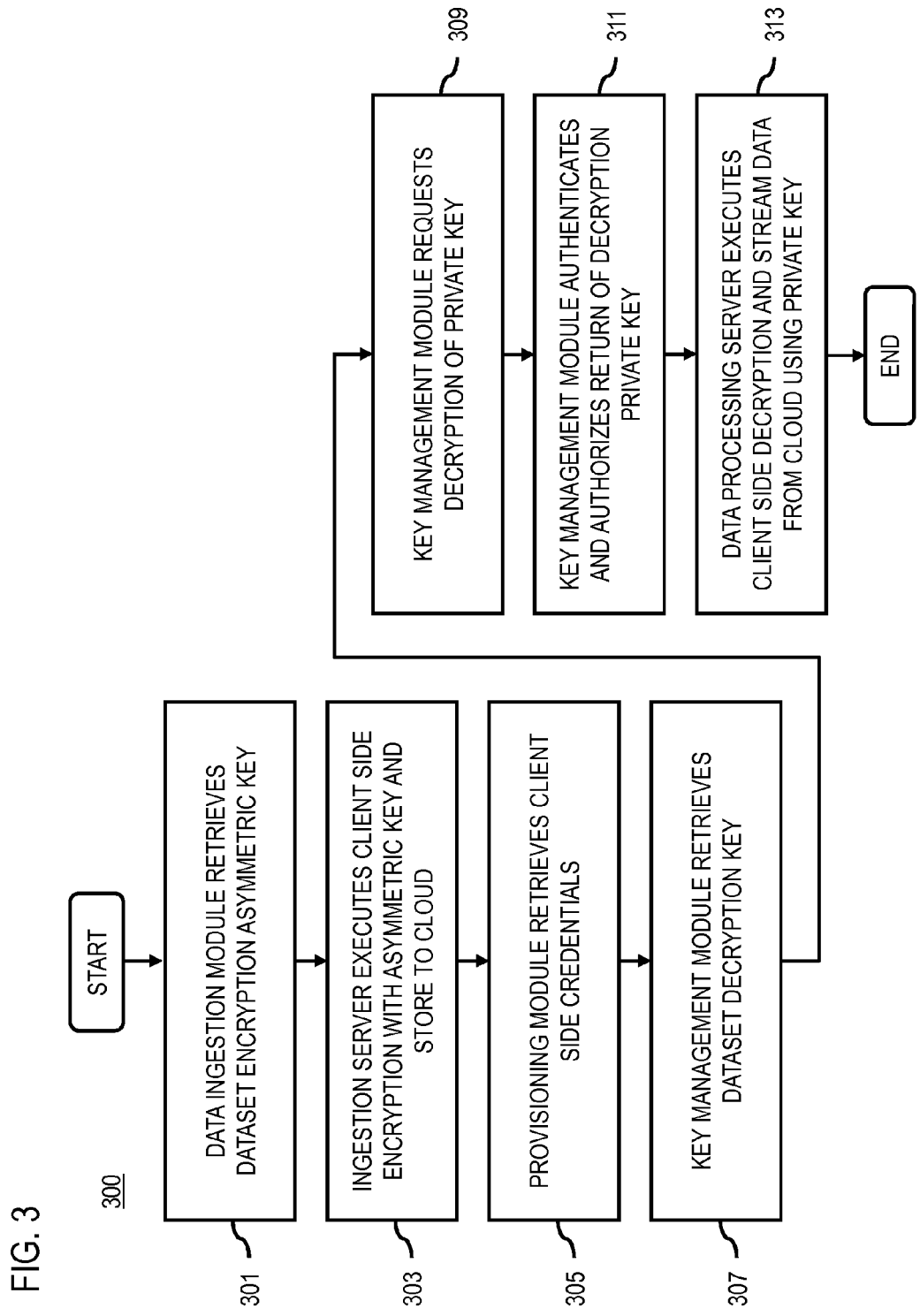
FIG. 3 is a flowchart of an overview of a process for providing multi-layered key management for encrypted datasets, according to one embodiment.

Various embodiments of the components of the key management platform 101 are described with respect to FIG. 3, a flowchart of an overview of a process 300 for providing multi-layered key management for encrypted datasets 111, according to one embodiment. The example illustrated in the process 300 includes using key management for ingesting/encrypting the datasets and then reading the ingested datasets 111 using various embodiments of the multi-layered secured key management of the key management platform 101. In one embodiment, the ingestion and reading processes are separate processes performed separately by client side components (e.g., data ingestion via the key management client 109) and the network side components (e.g., data reading and key management by the key management platform 101 and/or the cloud service 103).

In step 301 of the process 300, a business unit client 105 initiates a process to migrate its datasets 111 to an organizational cloud storage service (e.g., cloud service 103). For example, the business unit can aggregate the data to support it end-user facing applications 113 as previously described. As part of this process to ingest and encrypt the data from the business unit into the cloud service 103, the data ingestion module 203 initiates a retrieval of a dataset asymmetric encryption key. In one embodiment, the key management platform 101 uses asymmetric encryption instead of symmetric encryption to provide an additional level of security and to provide for more secured key management that manages private keys within the organization. For example, even if the encryption public key is compromised, the associated datasets 111 cannot be decrypted without having the decryption private key.

Although the approaches described herein are also applicable to symmetric encryption, in an embodiment using asymmetric encryption, the system 100 can store the public key to the cloud service 103 using, for instance, access control policies to determine access to the public keys. In this way, business unit clients 105 can retrieve the public key and perform the encryption in a fully automated manner (e.g., using the key management client 109).

In step 303, once the asymmetric key is retrieved, the ingestion module 203 initiates or causes an execution of, for instance, a client-side encryption of the datasets using the asymmetric key for storage to the cloud service 103. The multi-layered security of the key management platform 101 then ensures that decryption users are authenticated and authorized to connect to the key management platform 101 to initiate a reading of the ingested datasets 111.

In step 305, to support the authentication and authorization of decryption users (e.g., clients 105), the provisioning module 205 retrieves client-side secure credentials (e.g., client-side SSL certificate) from, e.g., the provisioning database 207 to authenticate the decryption user.

In step 307, once the decryption user is authenticated, the key management module 201 determines whether a dataset object decryption key reference (e.g., a reference indicated a key associated with a requested dataset) is stored or otherwise managed in the key management platform 101. If the dataset object decryption key reference exists, the key management module 201 returns the reference to the client 105 to identify the private key associated with the requested dataset 101. In one embodiment, the private key is identified using a private key reference identifier (ID) that can used to initiate retrieval of the private key from the key repository 119. In one embodiment, the key management module 201 initiates a client-server HTTPS Rest request for the decryption private key based on the private key reference ID.

In step 309, the key management module 201 authenticates and authorizes the return of the decryption private key to the requesting client 105 or decryption user. In one embodiment, the authentication and authorization of the decryption user is via a two-way SSL connection. By way of example, via an SSL client certificate, the key management module 201 can authenticate and authorize the requesting client 105 based on whether the client 105 or decryption user has permission or rights granted to receive the requested key. In one embodiment, the key permissions or rights can be stored and queried from the provisioning database 207. The key management module 201 determines whether to return the private key upon data reading based on specified permissions and/or rights.

In step 311, the data processing server of the client 105 and/or the cloud 103 executes client-side decryption and streams the requested datasets 111 from the cloud service 103 using the private key.

Figure 4:
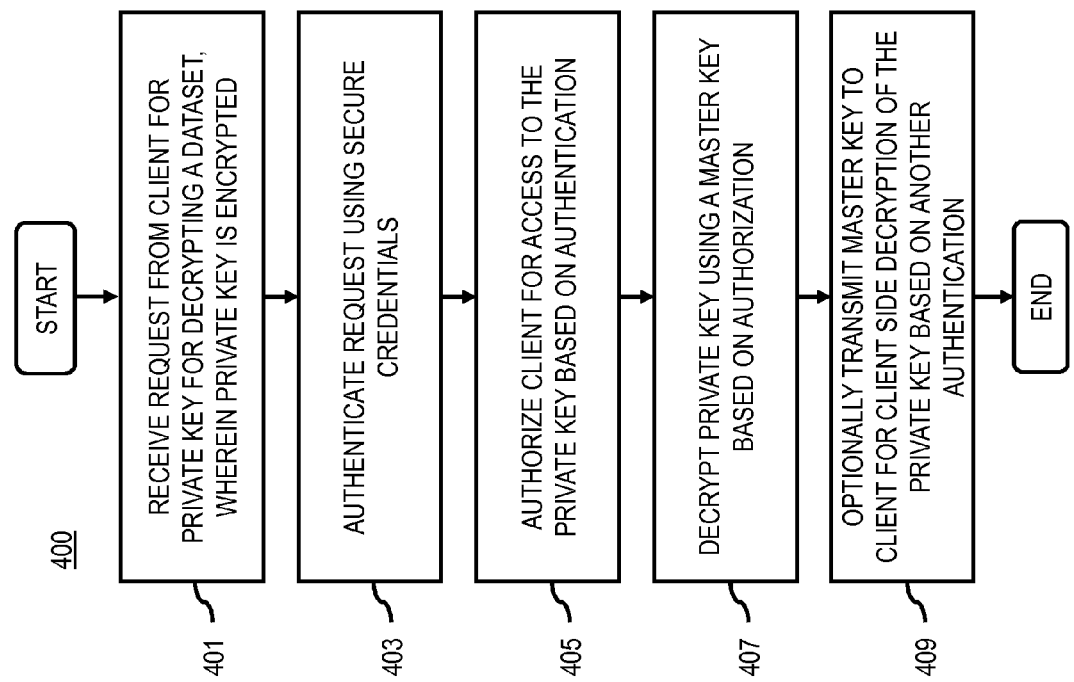
FIG. 4 is flowchart of a process for providing key management for data encryption, according to one embodiment.
Figure 9:
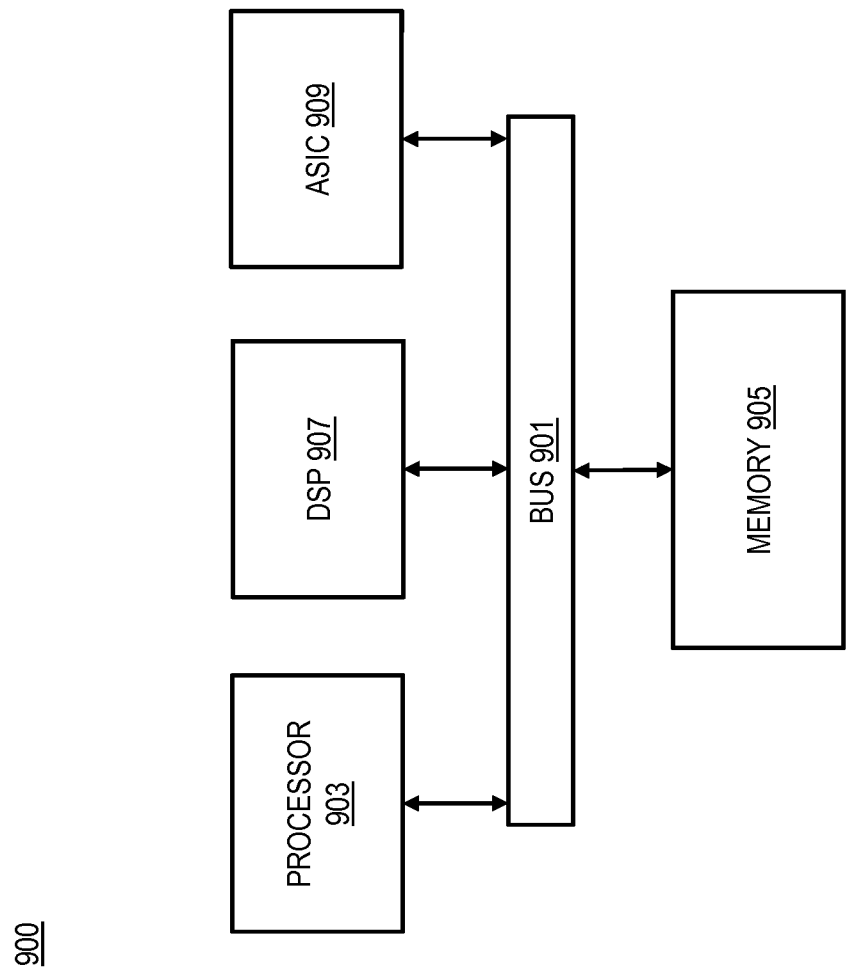
FIG. 9 is a diagram of a chip set that can be used to implement an embodiment of the invention.

FIG. 4 is flowchart of a process for providing key management for data encryption, according to one embodiment. In one embodiment, the key management platform 101 performs the process 400 and is implemented in, for instance, a chip set including a processor and a memory as shown in FIG. 9. In addition or alternatively, the key management client 109 can perform all or a portion of the process 400. The process 400 describes providing key management during a dataset read operation and assumes that the datasets have previously been ingested and encrypted in the cloud service 103. A detailed example of the process 400 is described with respect to FIGS. 7B and 7C below.

In step 401, the key management platform 101 receives a request from at least one client (e.g., client 105) for one or more private keys for decrypting one or more datasets 111, wherein the one or more private keys are encrypted in at least one key repository 119 associated with at least one server (e.g., cloud service 113). In one embodiment, the request for the private keys is initiated during a data decryption process by a client 105. For example, the client 105 receives a request to for data associated with one or more end-user facing applications 113 that use or access encrypted data stored in the cloud service 103. In one embodiment, the key management platform 101 processes the request using a multi-layered security approach involving, at least in part, authentication and authorization of the requesting client 105, as well as additional security measures such as encrypting private keys.

Accordingly, in step 403, the key management platform 101 causes, at least in part, an authentication of the request using one or more secure credentials of the at least one client, the at least one server, or a combination thereof. In one embodiment, the one or more secure credentials is a Secure Sockets Layer (SSL) certificate, and wherein the request, the decrypted one or more private keys, or a combination thereof is transmitted using an SSL protocol. In one embodiment, the at least one client and the at least one server communicate using a two-way Secure Sockets Layer (SSL) connection of the SSL protocol. It is contemplated that the SSL protocol is provided by way of illustration and not limitation. Accordingly, any equivalent secured connection protocol are applicable to the various embodiments described herein. Example embodiments of the signaling and handshake procedures that can be used by the key management platform 101 are discussed below with respect to FIGS. 7B and 7C.

In step 405, the key management platform 101 causes, at least in part, an authorization of the at least one client to determine whether the at least one client is authorized to access the one or more private keys based on the authentication. For example, in addition to the authentication process of step 403, the key management platform 101 can further verify whether the requesting client 105 has been authorized (e.g., via a provisioning process) to receive the private keys. By way of example, it is contemplated that the key management platform 101 may use any level authorization (e.g., unconditionally authorized; conditionally authorized based on one or more criteria such as time of day, activity, or any other contextual parameter; not authorized for any purpose; etc.).

In step 407, the key management platform 101 causes, at least in part, a decryption of the one or more private keys using at least one master key based on the authorization. In one embodiment, if the key management platform 101 determines that the client 105 is authenticated and authorized to receive the private key, the key management platform 101 initiates a decryption of the private keys using a master key. In one embodiment, the master key can be distributed only to trusted entities (e.g., Rest API servers) within the organization. It is noted that in various embodiments, the key management platform 101 can apply any number of additional security layers to protect the private keys and eventual decryption of protected data including those describe in the embodiments discussed below.

Alternatively, if for instance the client 105 itself is trusted by the key management platform 101 or otherwise privileged, in step 409, the key management platform 101 optionally causes, at least in part, a transmission of the at least one master key to the at least one client based on another authentication process. In one embodiment, the decryption of the one or more private keys is performed by the at least one client using the at least one master key.

Figure 5:
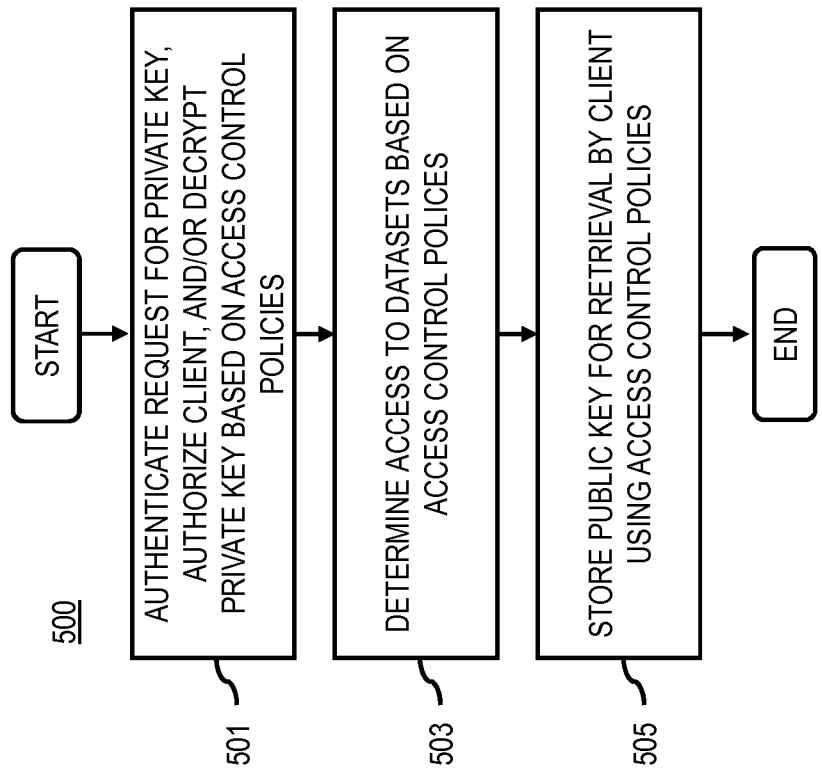
FIG. 5 is a flowchart of a process for using access policies for applying access control policies to provide key management using multi-layered security, according to one embodiment.

FIG. 5 is a flowchart of a process for using access policies for applying access control policies to provide key management using multi-layered security, according to one embodiment. In one embodiment, the key management platform 101 performs the process 500 and is implemented in, for instance, a chip set including a processor and a memory as shown in FIG. 9. In addition or alternatively, the key management client 109 can perform all or a portion of the process 500. In certain embodiments, the key management platform 101 implements the process 500 in conjunction with the process 400 of FIG. 4 to provide another layer of security using access control policies for key management.

For example, in one embodiment, for any stage of the key management process, the key management platform 101 can apply any number access control policies to provide additional security. In one embodiment, access control policies can define criteria for who (e.g., which client 105 or requesting entity) can access assets (e.g., keys, datasets, servers, etc.) under what conditions (e.g., read only, write only, read/write, etc.) and context. The control policies can then be enforced in addition to other mechanisms such as SSL connections/handshakes, authorizations, encryption, etc.

Accordingly, when processing requests for private keys to decrypt stored datasets from one or more clients, in step 501, the key management platform 101 determines the authentication of the request, the authorization of the at least one client, the decryption of the one or more private keys, or a combination thereof based on one or more access control policies. In other words, the key management platform 101 determines whether the requested activity complies with any applicable access control policy. In one example, an access policy may limit access to specific encrypted datasets only to business unit clients 105 have been specifically authorized by an end-user. In other cases, the end-user may set conditions for when access is available (e.g., only for a predetermined period of time, only under certain conditions such as emergency conditions, etc.). In one embodiment, it is contemplated that the type and complexity of access control policies is limited only a user, the business units, the parent organization, and/or other authorized entity.

In step 503, the key management platform 101 causes, at least in part, a storage of one or more public keys of the at least one asymmetric encryption for retrieval by the at least one client using one or more access control policies. In one embodiment, the types of operations that a client 105 can performed can be controlled by access control policies. For example, policies may allow storage by not reading, viewing but not modifying, etc.

In step 505, the key management platform 101 determines whether to grant access to the one or more datasets by the at least one client based on one or more access control policies. In addition to what operations can be performed, whether a client 105 can have access to a dataset can be further controlled by a policy.

Accordingly, by enforcing access control policies in addition to other security measures, the policies can potentially still limit exposure of sensitive data when other security measures (e.g., SSL certificates, public/private keys, master keys, etc.) are compromised.

Figure 6:
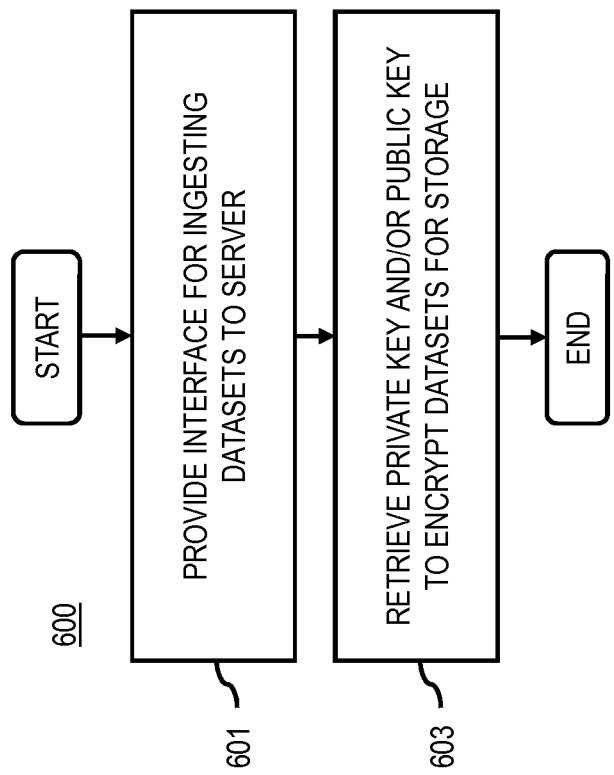
FIG. 6 is a flowchart of a process for ingesting datasets to facilitate key management, according to one embodiment.

FIG. 6 is a flowchart of a process for ingesting datasets to facilitate key management, according to one embodiment. In one embodiment, the key management platform 101 performs the process 600 and is implemented in, for instance, a chip set including a processor and a memory as shown in FIG. 9. In addition or alternatively, the key management client 109 can perform all or a portion of the process 600. In one embodiment, the process 600 is performed prior to the reading process described with respect to the process 500 of FIG. 5 to ingest and encrypt datasets into the cloud service 103. A more detailed example of the ingestion process is discussed with respect to FIG. 7A below.

In step 601, the key management platform 101 provides at least one interface for an ingestion of the one or more datasets to the at least one server. In one embodiment, the at least one interface includes at least one Secure Sockets Layer (SSL) tunnel. In one embodiment, the interface (e.g., SSL tunnel) serves as one level of security provided by the system 101 in the context of secured key management from ingestion to reading.

In step 603, the ingestion comprises retrieving the one or more private keys, one or more public keys, or a combination thereof for the at least one key repository to encrypt the one or more datasets. By way of example, for asymmetric encryption, in many cases, the key management platform 101 will retrieve and provide only the public keys to a client for encryption. However, in some embodiments or scenarios (e.g., when the client 105 that is performing the encryption has an elevated trust or privilege level), the private keys may be retrieved on ingestion using a read process described above.

Figure 7A:
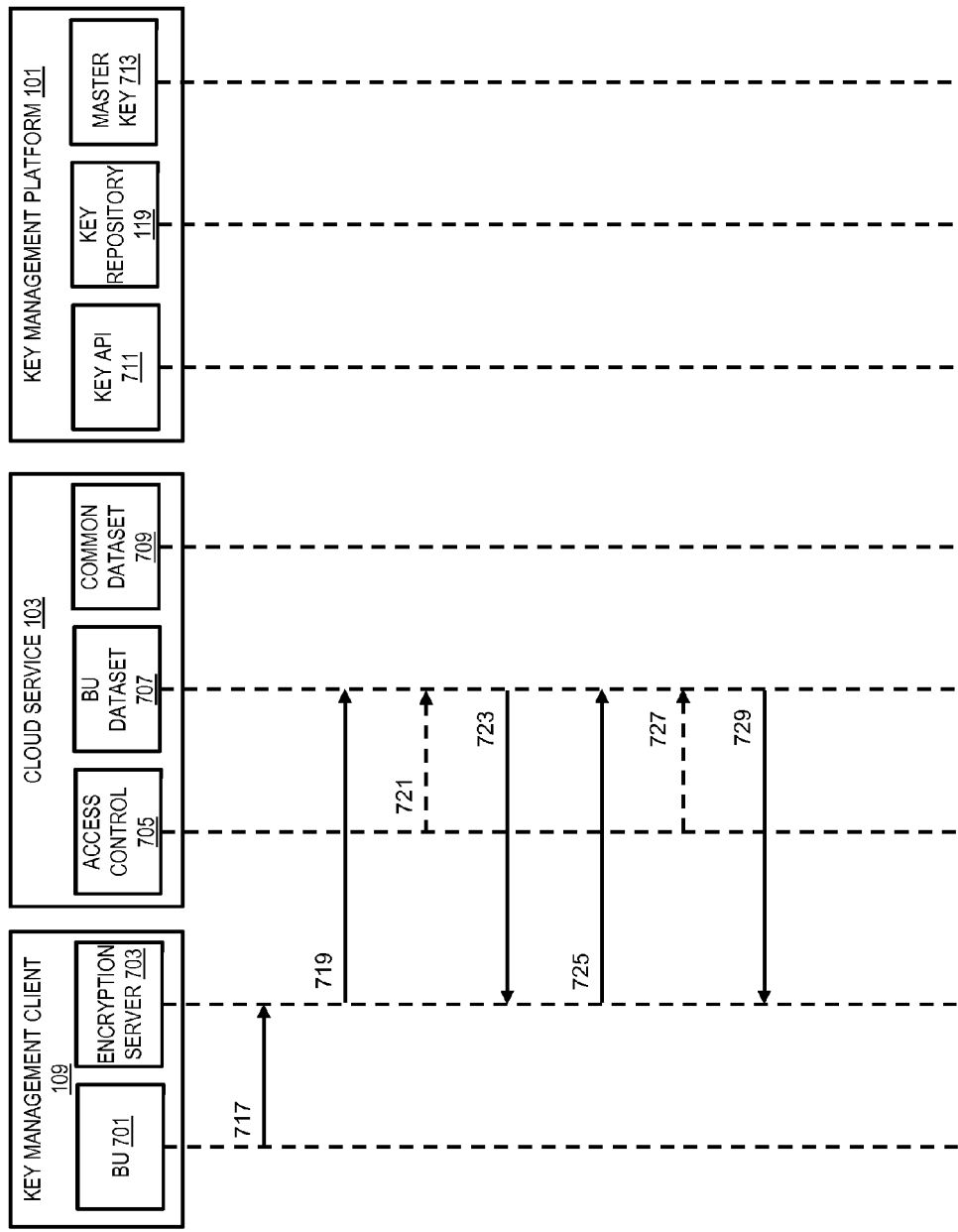
FIG. 7A is a time sequence diagram illustrating an example data ingestion/encryption process using multi-layered security key management, according to one embodiment.

In one embodiment, an access to the at least one interface, the ingestion of the one or more datasets, or a combination is also based on one or more access control policies FIG. 7A is a time sequence diagram illustrating an example data ingestion/encryption process using multi-layered security key management, according to one embodiment. More specifically, FIG. 7A is a ladder diagram that illustrates a sequence of messages and processes for ingesting data using the key management platform 101 in combination with the key management client 109 (a business unit client side) and the cloud service 103. A network process is represented by a thin vertical line. A step or message passed from one process to another is represented by horizontal arrows. A dashed horizontal arrow represents an optional step or conditional step.

The processes represented in FIG. 7A are a key management client 109 comprising a business unit (BU) 701 (e.g., a client 105) and an encryption server 703; a cloud service 103 comprising an identity and access control module 703, a BU dataset 707, and a common dataset 709; and a key management platform 101 comprising a key API server 711 (e.g., a Rest API server), a key repository 119, and a master key 713.

In the example of FIG. 7A, the processes demonstrate interactions between the key management client 109 and the cloud service 103 for ingesting data. By way of example, ingesting data includes encrypting the data and then writing the data to the cloud service 103 for storage.

In process 717, to initiate the ingestion process, the BU 701 access a secure interface to the data encryption server 703. In this example, the BU 701 establishes an SSL tunnel connection with the data encryption server 703 for raw data aggregation. In response, the data encryption server 703 sends a request to the BU specific dataset 707 of the cloud service 103 to retrieve the BU owned/dataset encryption public key (process 719). In one embodiment, the arguments for the request include identifying the requested bucket and dataset.

In one embodiment, if access control policies are in place, the identity and access control module 705 of the cloud service 103 can verify whether the requesting BU 701 has the correct identity and is provisioned to access the requested public key. The access control module 705 then sends a message with the results of the determination to the BU dataset 707 (process 721). If the verified by the access control module 705, the BU dataset 707 returns the BU owned dataset public key to the data encryption server 701 (process 723).

In process 725, the data encryption server 703 encrypts the raw data aggregated from the BU 701 using the public key via asymmetric encryption, and transmits the encrypted data to the BU dataset 707 for storage. If access control policies are in place, the access control module 705 determines whether access control policies permit the BU 701 to store the encrypted data to the cloud server 103 and sends the determination to the BU dataset 707 (process 727). The BU dataset confirms whether the BU 701 has permission to store the encrypted data and sends a message indicating the encrypted data has been stored at the BU dataset 701 if successful (process 729).

Figure 7B:
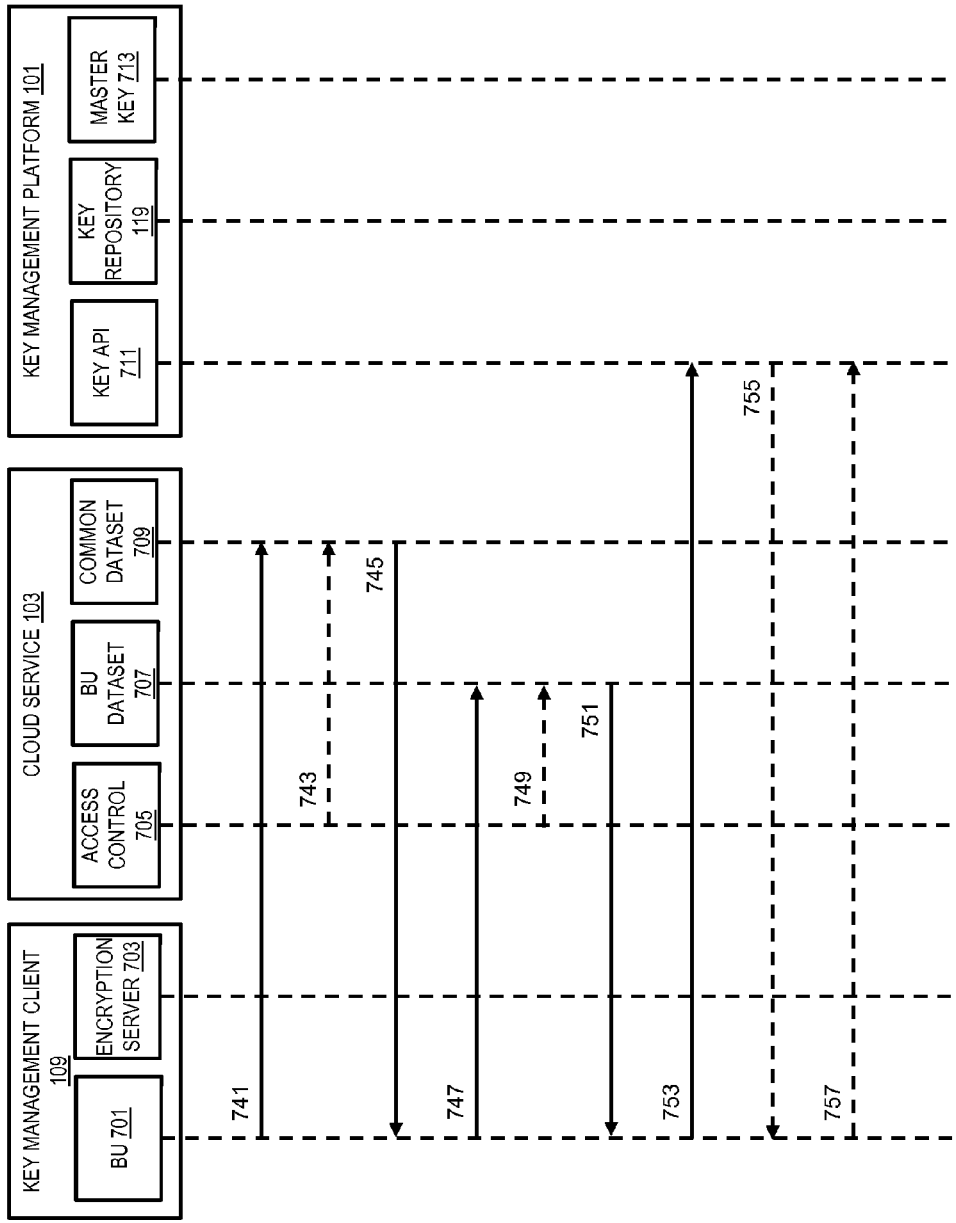
FIGS. 7B and 7C are time sequence diagrams illustrating an example data reading/decryption process using multi-layered security key management, according to one embodiment.
Figure 7C:
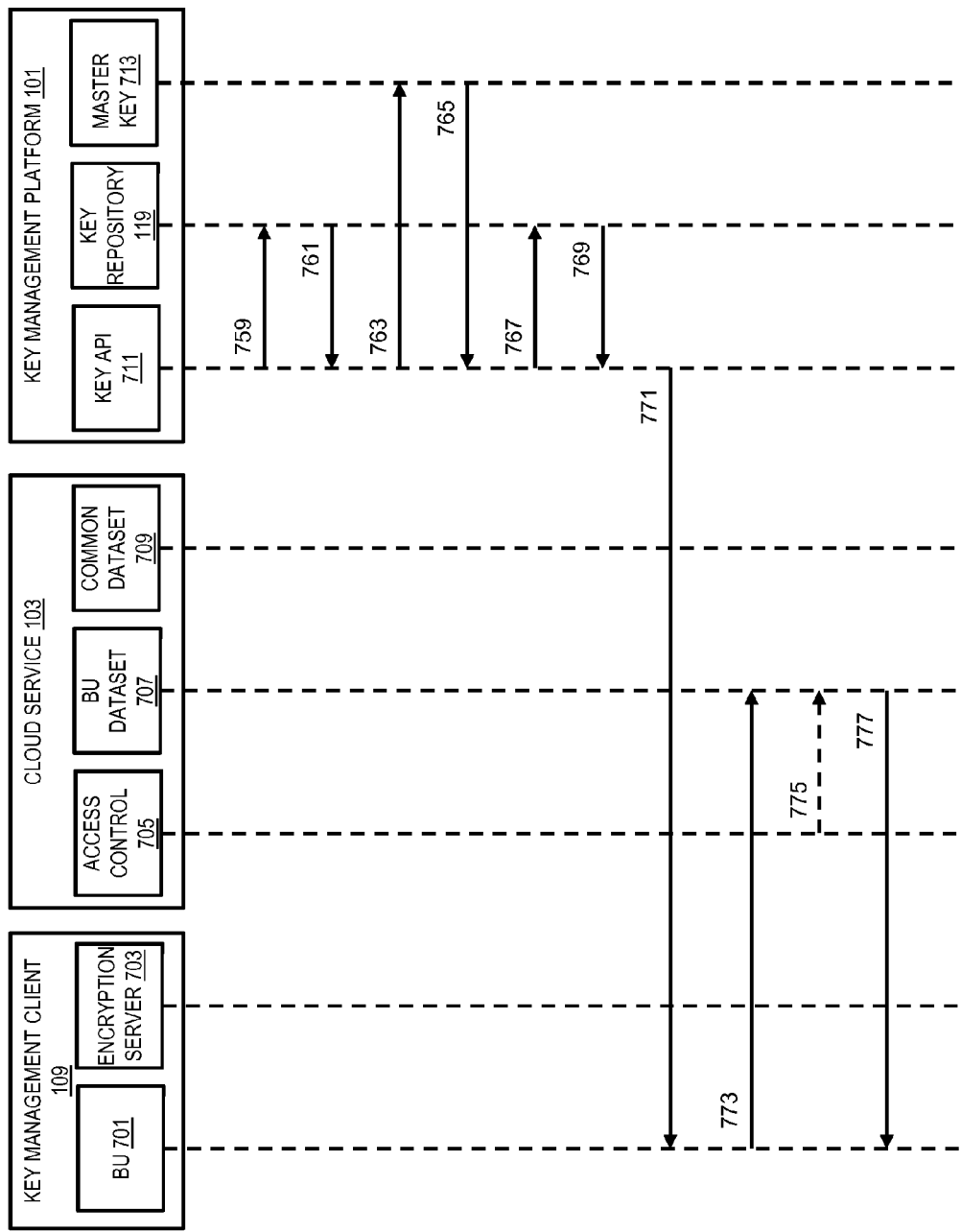

FIGS. 7B and 7C are time sequence diagrams illustrating an example data reading/decryption process using multi-layered security key management, according to one embodiment. More specifically, FIGS. 7B and C are ladder diagrams that illustrate a sequence of messages and processes for data decryption (data reading) using the key management platform 101 in combination with the key management client 109 (a business unit client side) and the cloud service 103. A network process is represented by a thin vertical line. A step or message passed from one process to another is represented by horizontal arrows. A dashed horizontal arrow represents an optional step or conditional step.

The processes represented in FIGS. 7B and 7C are a key management client 109 comprising a business unit (BU) 701 (e.g., a client 105) and an encryption server 703; a cloud service 103 comprising an identity and access control module 703, a BU dataset 707, and a common dataset 709; and a key management platform 101 comprising a key API server 711 (e.g., a Rest API server), a key repository 119, and a master key 713. FIGS. 7B and 7C assume that encrypted data has already been stored in the BU dataset 707 (e.g., using the process described with respect to FIG. 7A).

In process 741 of FIG. 7B, the BU 701 begins the data decryption process by initiating an authentication/authorization process. For example, the BU 701 sends a request for secure credentials to the common dataset 709 of the cloud service 103. In one embodiment, the request includes an argument specifying the business unit name and/or identifier. In one embodiment, the common dataset 709 includes a secure credentials database 121 to provide a commonly accessible storage for credentials of business units/entities within an organization.

In one embodiment, the system 100 can apply access control policies to determine which decryption users have permission to obtain associated secure credentials (e.g., SSL certificates). Accordingly, in process 743, the identity and access control module 703 can verify the identity of the requestor and whether the requestor has requisite permissions or rights to access the credentials, and sends the determination to the common dataset 709. In process 745, the common dataset 709 returns the requested secure credentials to the BU 701 based on the determination made by the access control module 705.

In process 747, the BU 701 then initiates a request to retrieve data decryption key meta data (e.g., dataset object decryption key reference) that associates a key reference ID for the decryption key associated with a requested dataset. If access control policies are in place, the access control module 705 determines whether the BU 701 has permission and identity to obtain the requested decryption key meta data and/or key reference ID, and send a message with the determination to the common dataset 709 (process 749). Based on the determination from the access control module 705, the common dataset 709 returns the decryption key meta data and/or reference ID to the BU 701 (process 751).

After obtaining the BU secure credentials (e.g., BU SSL certificate) and the decryption key reference ID, the BU 701 sends a request to authenticate itself to the key API server 711 (e.g., Rest API server) of the key management platform 101 (process 753). In one embodiment, the BU 701 presents the BU SSL certificate to the key API server 711 as part of a two-way SSL authentication via an HTTPS Rest API request. The key API server 711 (e.g., acting as an SSL or Rest server) authenticates the client side certificate (process 755). The BU 701 then authenticates the SSL certificate or other secure credentials presented by the key API server 711 to complete the two-way authentication (e.g., a two-way SSL handshake) (process 757).

Following the completion of the two-way authentication, the key API server 711 sends a request to the key repository 119 to determine whether the BU 701 is authorized for the requested key (process 759). If the key repository 119 confirms or authorizes the BU 701 to receive the requested key by, for instance, checking a provisioning database or other record to determine permissions or rights, and returns the determination to the key API server 711 (process 761).

After the key API sever 711 authenticates (e.g., via a two-way SSL handshake) and authorizes (e.g., via querying of the key repository 119 for permissions) the BU 701, the key API server 711 sends a request to the master key server 713 to retrieve the master key to decrypt the encrypted private key (process 763). As previously discussed, in one embodiment, the private keys are further encrypted for storage in the key repository 119 as another level of security. Accordingly, even if other security measures are compromised so that the encrypted private key is exposed, external parties would still need access to the master key to decrypt the encrypted private key to enable decryption of the datasets associated with the private key.

Based on the authentication and authorization of the BU 701, the master key server 713 returns the master key to the key API server 711 (process 765). The key API server 711 then retrieves the encrypted private key (e.g., using the decryption key reference ID provided by the BU 701) from the key repository (process 767) and decrypts the private key using the master key (process 769).

In process 771, the key API server 711 returns the decrypted private key that is encoded over a secure communication connection (e.g., an SSL connection) to the BU 701. The BU 701 then sends a request to download encrypted data from the BU dataset 707 (process 773). If access control policies are in place, the access control module 703 determines the identity and access permissions/rights of the BU 701 to the requested encrypted data, and sends the determination to the BU dataset 707 (process 775). If confirmed by the access control module 705, the BU dataset 707 then transmits or streams the requested encrypted dataset to the BU 701 for client-side decryption using the private key (process 777).

The processes described herein for providing key management for data encryption may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
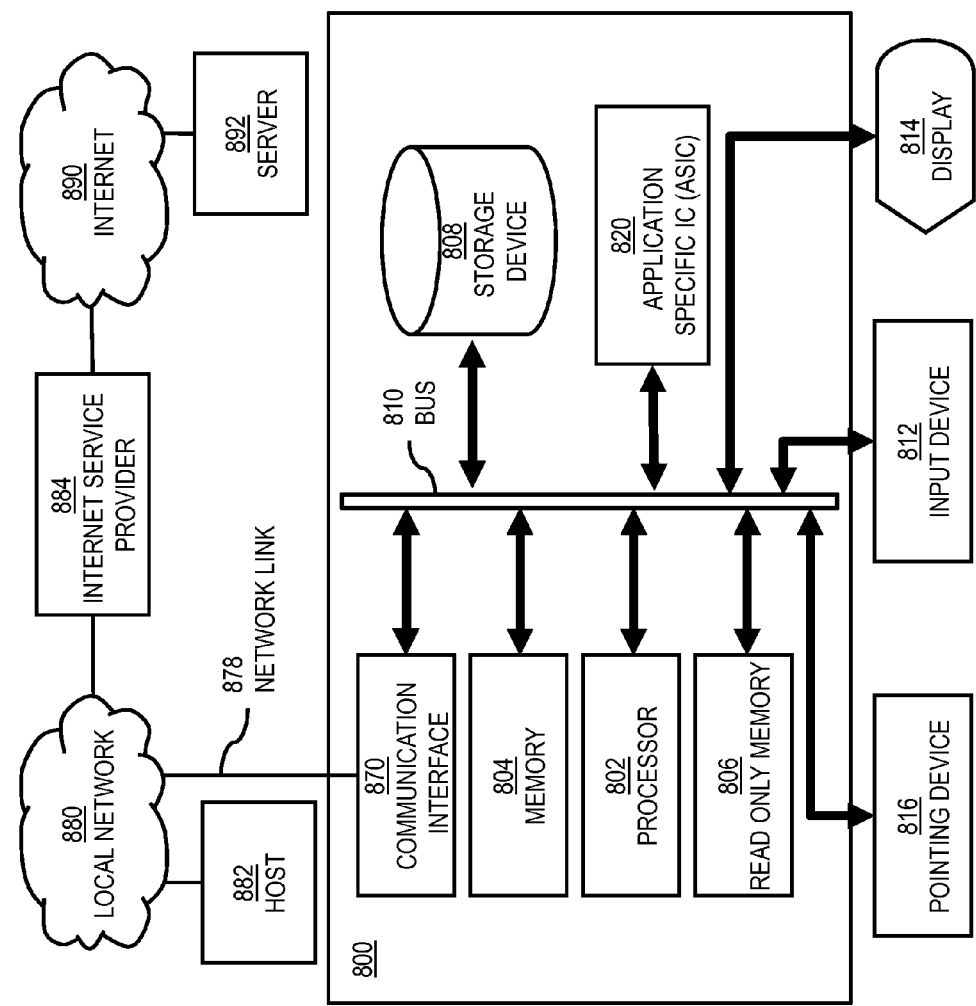
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to provide key management for data encryption as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing key management for data encryption.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to providing key management for data encryption. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for providing key management for data encryption. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing key management for data encryption, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for providing key management for data encryption.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to provide key management for data encryption as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of providing key management for data encryption.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide key management for data encryption. The memory 905 also stores the data associated with or generated by the execution of the inventive steps.

Figure 10:
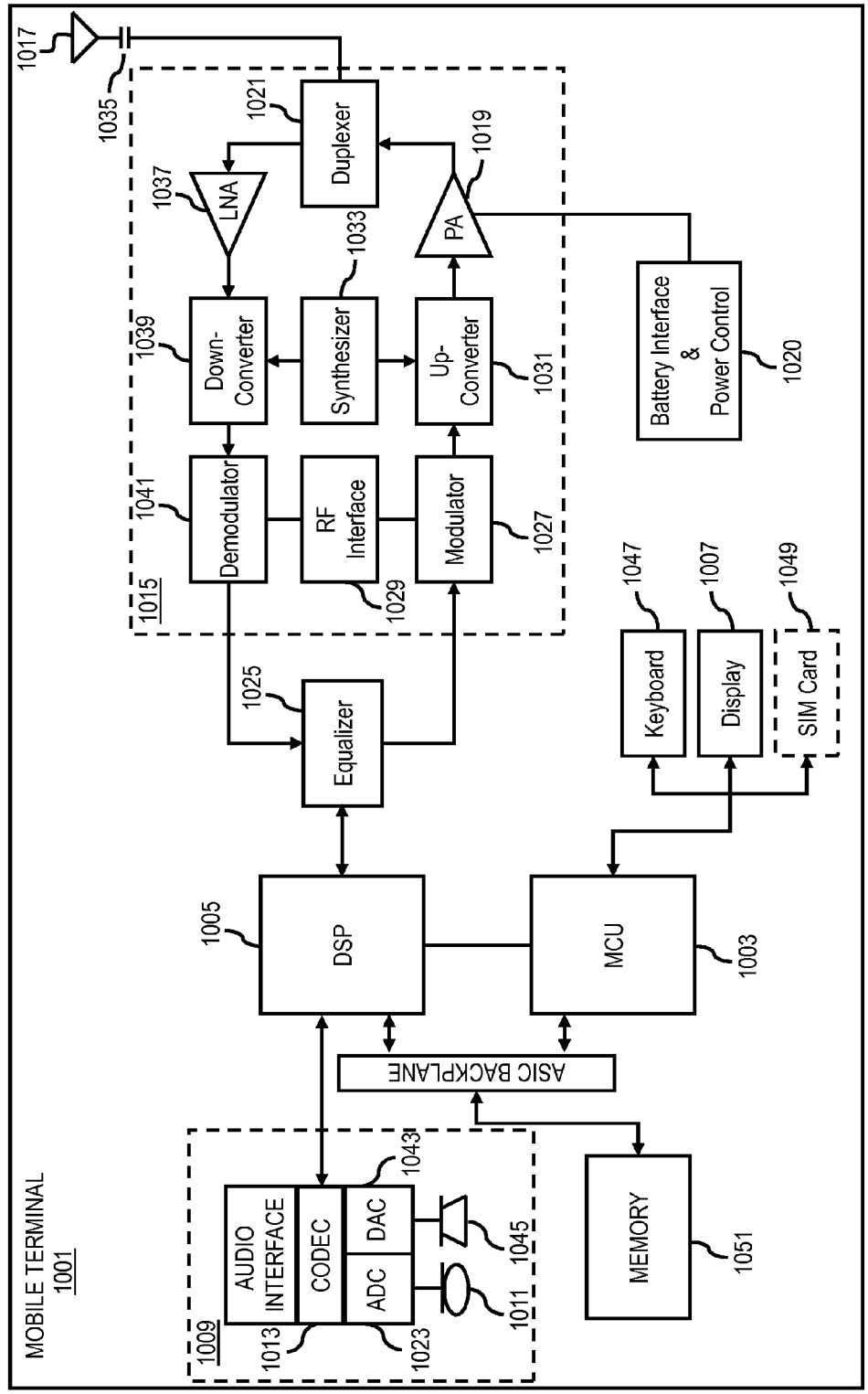
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of providing key management for data encryption. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing key management for data encryption. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide key management for data encryption. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for providing key management for encryption of data, the method comprising:
   utilizing at least one interface to ingest of one or more encrypted datasets to at least one server;
   causing, at least in part, the ingestion, utilizing a processor, including a storage of the one or more encrypted datasets;
   receiving a request from at least one client for one or more private keys for decrypting the one or more encrypted datasets,
      wherein the one or more private keys are encrypted in at least one key repository associated with the at least one server;
   causing, at least in part, an authentication of the request using one or more secure credentials of the at least one client, the at least one server, or a combination thereof;
   causing, at least in part, an authorization of the at least one client to determine whether the at least one client is authorized to access the one or more private keys based on the authentication; and
   causing, at least in part, a decryption of the one or more private keys using at least one master key based on the authorization.

2. The method of claim 1, further comprising:
   causing, at least in part, a transmission of the at least one master key to the at least one client based on another authentication process,
      wherein the decryption of the one or more private keys is performed by the at least one client using the at least one master key.

3. The method of claim 1, wherein the one or more secure credentials is a Secure Sockets Layer (SSL) certificate, and wherein the request, the decrypted one or more private keys, or a combination thereof is transmitted using an SSL protocol.

4. The method of claim 3, wherein the at least one client and the at least one server communicate using a two-way Secure Sockets Layer (SSL) connection of the SSL protocol.

5. The method of claim 1, further comprising:
   determining the authentication of the request, the authorization of the at least one client, the decryption of the one or more private keys, or a combination thereof based on one or more access control policies.

6. The method of claim 1, wherein the one or more private keys are associated with at least one asymmetric encryption, the method further comprising:
causing, at least in part, a storage of one or more public keys of the at least one asymmetric encryption for retrieval by the at least one client using one or more access control policies.

7. The method of claim 1, further comprising:
determining whether to grant access to the one or more datasets by the at least one client based on one or more access control policies.

8. The method of claim 1,
wherein the ingestion comprises retrieving the one or more private keys, one or more public keys, or a combination thereof from the at least one key repository to encrypt one or more datasets.

9. The method of claim 8, wherein the at least one interface includes at least one Secure Sockets Layer (SSL) tunnel.

10. The method of claim 8, wherein an access to the at least one interface, the ingestion of the one or more datasets, or a combination is based on one or more access control policies.

11. An apparatus for providing key management for encryption of data, the apparatus comprising:
at least one processor; and
at least one memory including computer program code for one or more programs,
the at least one memory and the computer program code configured to, with the at least one processor, cause the apparatus to perform at least the following,
utilize at least one interface to ingest one or more encrypted datasets to at least one server,
cause, at least in part, the ingestion including a storage of the one or more encrypted datasets,
receive a request from at least one client for one or more private keys for decrypting the one or more encrypted datasets,
wherein the one or more private keys are encrypted in at least one key repository associated with the at least one server,
cause, at least in part, an authentication of the request using one or more secure credentials of the at least one client, the at least one server, or a combination thereof,
cause, at least in part, an authorization of the at least one client to determine whether the at least one client is authorized to access the one or more private keys based on the authentication, and
cause, at least in part, a decryption of the one or more private keys using at least one master key based on the authorization.

12. The apparatus of claim 11, wherein the apparatus is further caused to:
cause, at least in part, a transmission of the at least one master key to the at least one client based on another authentication process,
wherein the decryption of the one or more private keys is performed by the at least one client using the at least one master key.

13. The apparatus of claim 11, wherein the one or more secure credentials is a Secure Sockets Layer (SSL) certificate, and wherein the request, the decrypted one or more private keys, or a combination thereof is transmitted using an SSL protocol.

14. The apparatus of claim 13, wherein the at least one client and the at least one server communicate using a two-way Secure Sockets Layer (SSL) connection of the SSL protocol.

15. The apparatus of claim 11, wherein the apparatus is further caused to:
determine the authentication of the request, the authorization of the at least one client, the decryption of the one or more private keys, or a combination thereof based on one or more access control policies.

16. The apparatus of claim 11, wherein the one or more private keys are associated with at least one asymmetric encryption, and wherein the apparatus is further caused to:
cause, at least in part, a storage of one or more public keys of the at least one asymmetric encryption for retrieval by the at least one client using one or more access control policies.

17. The apparatus of claim 11, wherein the apparatus is further caused to:
determine whether to grant access to the one or more datasets by the at least one client based on one or more access control policies,
wherein the ingestion comprises retrieving the one or more private keys, one or more public keys, or a combination thereof from the at least one key repository to encrypt one or more datasets.

18. A non-transitory computer-readable storage medium carrying one or more sequences of one or more instructions which, when executed by one or more processors, cause an apparatus to perform a method for providing key management for encryption of data, the method comprising:
utilizing at least one interface to ingest one or more encrypted datasets to at least one server;
causing, at least in part, the ingestion including a storage of the one or more encrypted datasets;
receiving a request from at least one client for one or more private keys for decrypting the one or more encrypted datasets,
wherein the one or more private keys are encrypted in at least one key repository associated with the at least one server;
causing, at least in part, an authentication of the request using one or more secure credentials of the at least one client, the at least one server, or a combination thereof;
causing, at least in part, an authorization of the at least one client to determine whether the at least one client is authorized to access the one or more private keys based on the authentication; and
causing, at least in part, a decryption of the one or more private keys using at least one master key based on the authorization.

19. The computer-readable storage medium of claim 18, wherein the apparatus is further caused to perform:
causing, at least in part, a transmission of the at least one master key to the at least one client based on another authentication process,
wherein the decryption of the one or more private keys is performed by the at least one client using the at least one master key,
wherein the ingestion comprises retrieving the one or more private keys, one or more public keys, or a combination thereof from the at least one key repository to encrypt one or more datasets.

20. The computer-readable storage medium of claim 18, wherein the one or more secure credentials is a Secure Sockets Layer (SSL) certificate, and wherein the request, the decrypted one or more private keys, or a combination thereof is transmitted using an SSL protocol.

* * * * *